Figure 3:
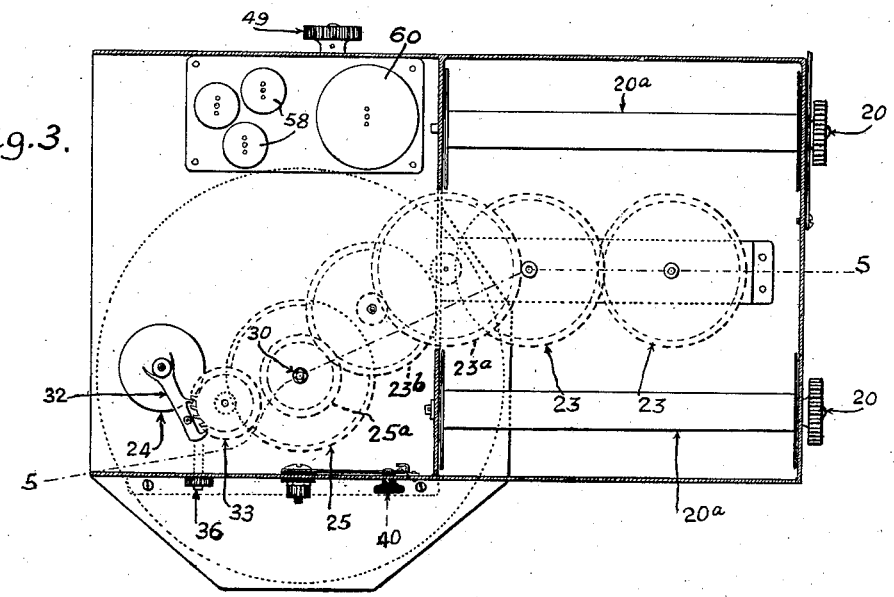

Jan. 7, 1930.  A. O. JESSEN  1,742,355
APPARATUS TO FACILITATE AERONAVIGATION
Filed Aug. 13, 1925  4 Sheets—Sheet 1
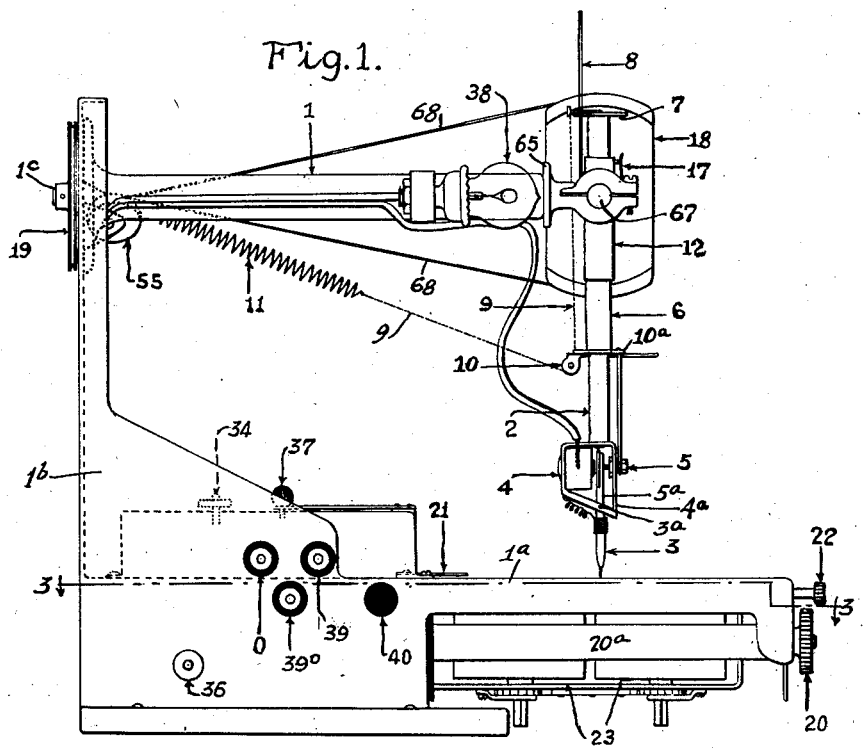
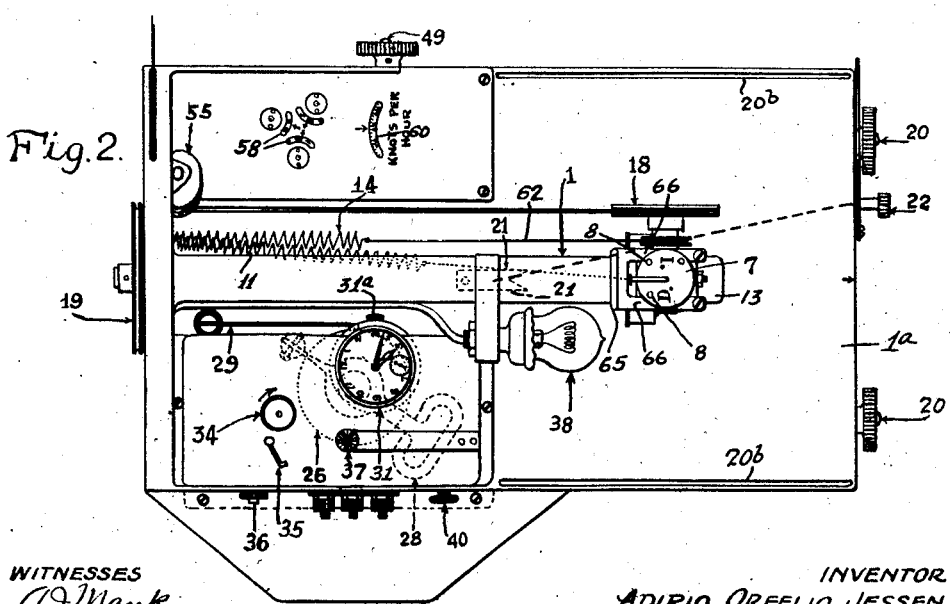
WITNESSES
INVENTOR
ADIRIO ORFELIO JESSEN
BY
ATTORNEYS Jan. 7, 1930.  A. O. JESSEN  1,742,355
APPARATUS TO FACILITATE AERONAVIGATION
Filed Aug. 13, 1925  4 Sheets-Sheet 2

WITNESSES
INVENTOR
ADIRIO ORFELIO JESSEN
BY
ATTORNEYS

Jan. 7, 1930.   A. O. JESSEN   1,742,355
APPARATUS TO FACILITATE AERONAVIGATION
Filed Aug. 13, 1925   4 Sheets-Sheet 3
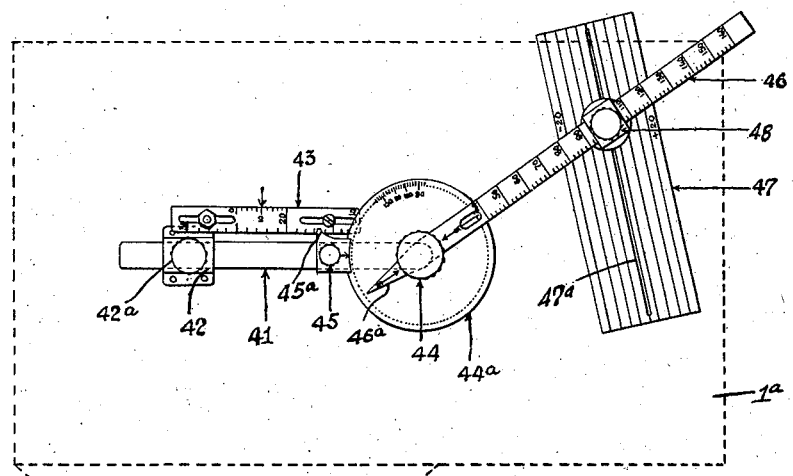
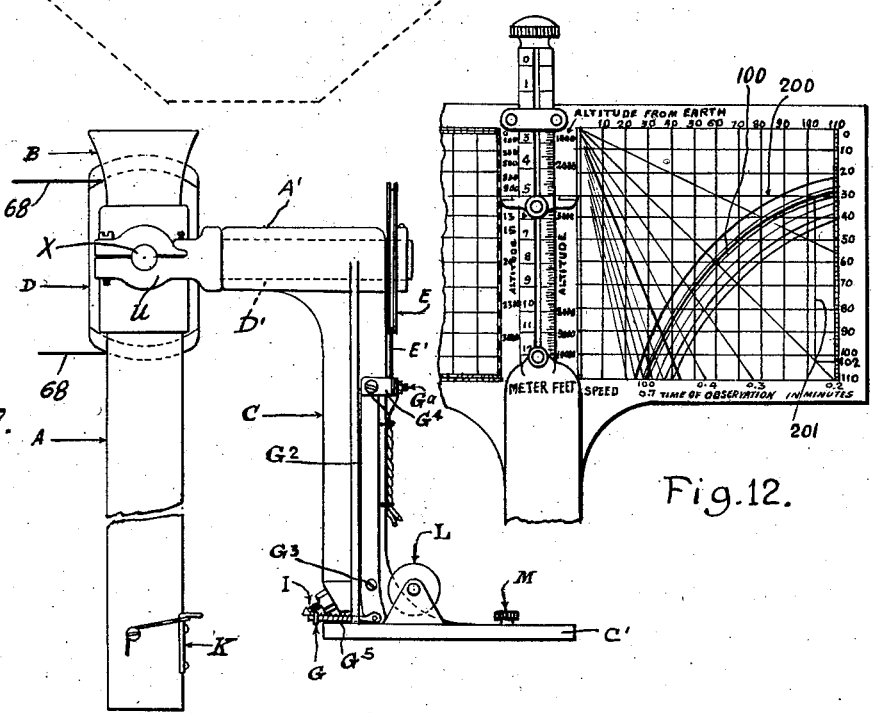
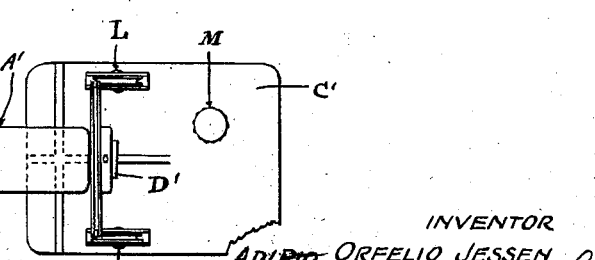
INVENTOR
ADIRIO ORFELIO JESSEN
BY
ATTORNEYS

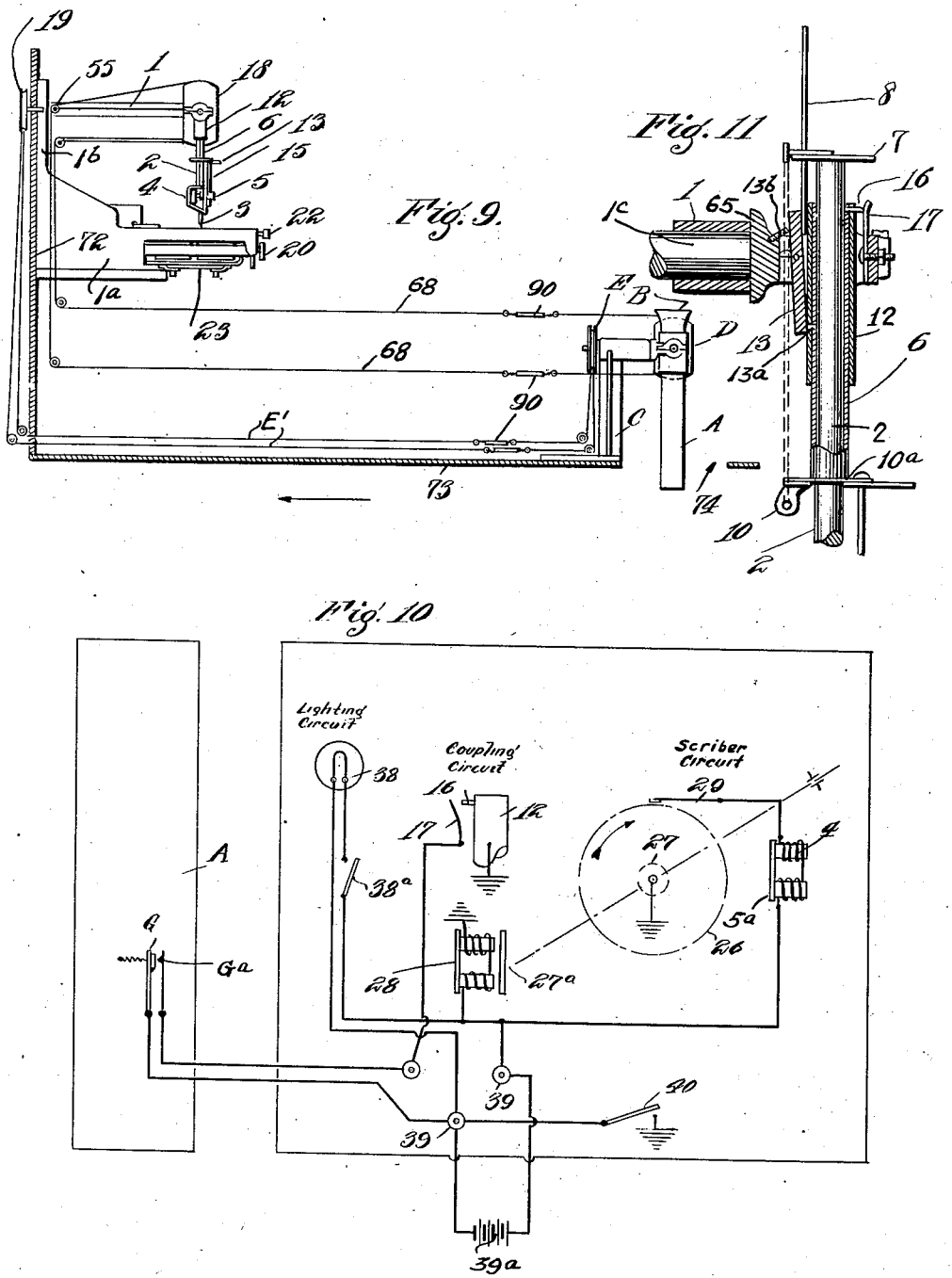

Patented Jan. 7, 1930

1,742,355

UNITED STATES PATENT OFFICE

ADIRIO ORFELIO JESSEN, OF VALPARAISO, CHILE

APPARATUS TO FACILITATE AERONAVIGATION

Application filed August 13, 1925. Serial No. 50,123.

This invention has relation to an apparatus for use in the navigation of airplanes, sea planes, airships and flying machines in general, herein included and comprised in the term air craft.

An object of the invention is the provision of an apparatus by which the navigation of air craft shall be simplified and by which the pilot shall be supplied, by means of a single observation, with the necessary data to enable him to calculate his position.

This invention is particularly adaptable for use in aeronavigation over trackless waste such as sea or desert, and when the area flown over is partially or wholly obscured or invisible by reason of the presence of mist, fog, clouds or lack of light.

Another object of the invention is the provision of an apparatus which includes the combination of sighting means and a recording means separate from but operatively connected therewith, the sighting means being adapted to record the movements thereof, in the form of a graph which is analyzed by a series of scales.

This invention will be best understood from a consideration of the following detailed description in connection with the accompanying drawings; nevertheless, it is to be understood that the invention is not confined to the disclosure, being susceptible of such changes and modifications as shall define no material departure from the salient features of the invention as expressed in the appended claims.

In the drawings:—

Figure 4:
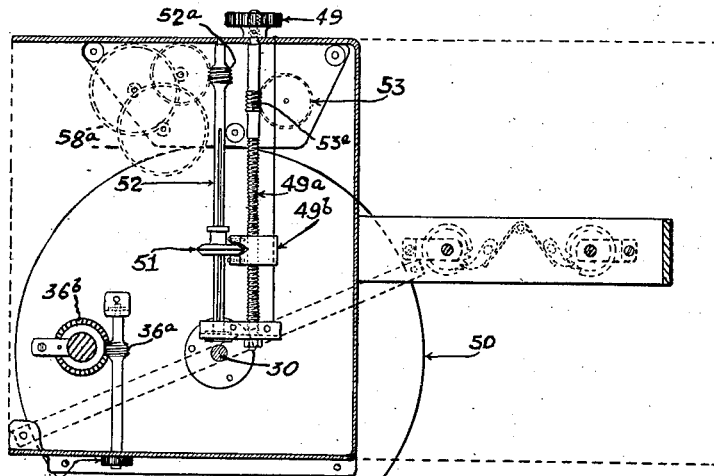
Figure 5:
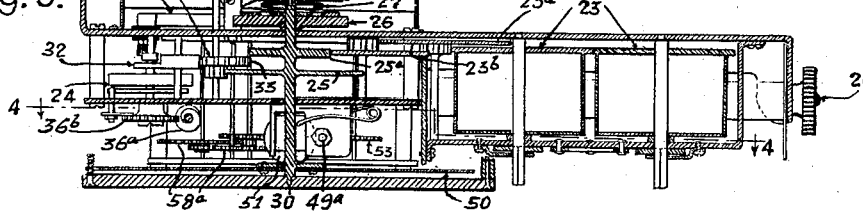

Figure 1 is a side view in elevation of a recording mechanism or scriber constructed according to the principles of my invention, Figure 2 is a plan view of the same, Figure 3 is a horizontal section taken on the line 3—3 of Fig. 1, Figure 4 is a horizontal section with parts broken away, and taken along the line 4—4 of Figure 5, Figure 5 is a vertical section taken along the line 5—5 of Fig. 3, Figure 6 is a plan view of a mechanism for analyzing graphs, Figure 7 is a view in elevation of a sighting device, Figure 8 is a plan view of the sighting device shown in Fig. 7, Figure 9 is a vertical section of a combined scriber and sighting means showing the application of the sighting means to the bottom of the air craft, Figure 10 is a diagrammatic view of the electric circuits of the various co-ordinated devices, Figure 11 is a fragmentary vertical section of the scriber, and Figure 12 shows diagrammatically an abacus employed in connection with the instruments.

Referring more particularly to the drawings, $1^a$ designates a base member having at one end a vertically disposed standard $1^b$ on the upper part of which a hollow arm is mounted to extend over and in parallel relation with the base member $1^a$. The arm is closed at its outer free end by a cap 65 mounted on one end of a rod $1^c$ contained within the arm 1 and extending through and beyond the other end of the hollow arm 1. A pulley 19 is secured to the rod $1^c$ and is adapted to be revolved in opposite directions by the rocking of the rod or shaft $1^c$, as will be presently explained.

The cap 65 has a pair of arms 66 extending laterally therefrom and normally in a horizontal plane which in conjunction with the cap constitutes a U-shaped member. A tube 12 is suspended between and from the extensions or arms 66 in order to hang vertically and also be capable of a swinging movement in a vertical plane. By reason of its mounting on the cap 65, the tube 12 is also capable of movement therewith and is swingable in a vertical plane at right angles to that just mentioned, when a sight A is actuated, as will be presently explained. In effect, the tube 12 has a universal mounting.

An axle 67 is supported in bearings carried by the arm 66 and is connected with the tube 12 to permit of swinging movement of the said tube in a vertical plane. A pulley 18 is connected with the tube 12 in such a manner that when the pulley is rocked the tube will be rocked and for this purpose I have provided a pair of wires 68 connected with the pulley and extending towards the left, as shown in Fig. 1, over a grooved wheel 55 rotatably supported on the standard 1<sup>b</sup>.

The tube 6 is contained and telescopically movable within the tube 12. A tube 2 is telescopically slidable within the tube 6 and has its opposite ends projecting beyond the ends of the tubes 6 and 12 and is normally supported in a predetermined position by means of a spring 11 (Fig. 11) connected at one end to the standard 1<sup>b</sup> and to a wire 9 trained over a pulley 10 carried by a plate 10<sup>a</sup>. By this construction the pencil is pressed upon the paper supported by the table 1<sup>a</sup>. The free end of the wire is secured to a plate 7 which in turn is attached to the top of the tube 2. The tube 2 is movable up and down within the tube 6, and is guided and restrained to rectilinear motion only by rods 8 mounted on the cap 65 or on an appurtenant part and passing through a perforation in the plate 7. The action of the spring 11 tends to cause the tube 2 to move in a downward direction. The plate 10<sup>a</sup> carrying the pulley 10 is secured to the lower end of the tube 6.

A bracket 4<sup>a</sup> is mounted on the lower end of the tube 2 and on this bracket a pencil holder 3 and an electromagnet 4 are mounted, the electro-magnet being a fixture and arranged to act on and swing the pencil holder 3 about its pivot 3<sup>a</sup> through the medium of an armature 5<sup>a</sup>. The pivotal displacement of the armature 5<sup>a</sup> is controlled by means of a regulating screw 5. The electromagnet 4 is included in an electric circuit of which the other members will be presently described, and which is closed by the movement of the sighting mechanism A.

A spring 14 is connected at one end to the standard 1<sup>b</sup> and at its other end to a cable 62 which in turn is connected to the tube 6. The spring 14 tends to draw the tube 6 upwardly within the tube 12. In use, the tube 6 is retained in its withdrawn position by a latch 13. When the tubes 12 and 6 are swung to one side of the vertical, as shown in Fig. 1, the latch is released and permits the spring 14 to move the tube 6 within the tube 12 for raising the stylus to an inoperative position. As shown more particularly in Fig. 11, the latch 13 is pivoted intermediate its ends and has a pin 13<sup>a</sup> at the lower end engaging a perforation in the sleeves or tubes 6 and 12 for retaining the tube 6 in its withdrawn position. When the tubes are rocked to and through an angle of 30° past the vertical, the set screw 13<sup>b</sup> in the cap 65 will engage the upper end of the latch 13 and rock the same, causing the pin 13<sup>a</sup> to be forced out of the perforations in the tubes 6 and 12 thereby releasing tube 6 and permitting the spring 14 to move the tube 6 upwardly and likewise the tube 2 and thereby raise the stylus from the paper.

A part of the base member 1<sup>a</sup> over which the pencil holder 3 is movable forms a table on which a sheet of paper is placed. This sheet of paper forms part of a long strip of paper attached at its ends to a pair of rollers 20<sup>a</sup>. A spring clip 21 is mounted on the base member 1<sup>a</sup> so as to extend partly across the table and holder. The spring has a V-shaped free end adapted to rest on the paper and is arranged to be raised from or lowered on to the paper by means of a knob 22 through intermediate connections (not shown).

A pair of spring drums 23 are mounted on the under side of the base member 1<sup>a</sup> between the pair of the rollers 20<sup>a</sup>. The spring drums drive gearing 23<sup>a</sup>, 23<sup>b</sup>, 25 and 25<sup>a</sup> also mounted on the under face of the base member 1<sup>a</sup>. A shaft 30 is the final element of the gearing and the main wheel 25 is mounted thereon. The gearing is controlled by an escapement 32 and the arrangement is such that the shaft 30 and wheel 25 make one revolution per minute. A disc 26 is loosely mounted on the shaft 30 and carries one member of a clutch 27, the other member of which is in driving connection with the shaft 30 and with a lever 27<sup>a</sup> by which it is actuated. Said lever is actuated by an electromagnet, 28, shown in Fig. 10 and Fig. 2. A spring contact member 29 is arranged to bear on one edge of the disc 26, said disc and contact 29 forming part of an electric circuit which includes the electromagnet 4. Mounted on the periphery of the disc 26 is a plurality of segments of insulating material so spaced apart and of such length that during the rotation of said disc, the electric circuit is opened ten times and on each occasion for the space of half a second. The opening and closing of the electric circuit causes the electromagnet 4 to act on the armature 5<sup>a</sup> carrying the pencil holder 3 which causes oscillation of said holder. A knob 37 is connected with the disc 26 whereby said disc may be reset and returned to zero.

The flight watch or time indicator 31, or the instrument which is adapted to measure the time taken by the flying air craft from the start, is connected to the extreme end of the main axle 30 and its mechanism is identical with that of a common watch, in which the spring, the balance wheel, and the escapement have been removed, the watch mechanism being moved by means of a connection between the shaft 30 and the wheels of the watch. To set the watch, the winding knob 31<sup>a</sup> is pulled outwardly in the same manner as is usually done in the ordinary watch and after the hands are in position the knob is placed back in the usual manner. At the side of the watch is disposed the end of the axle of the escapement in the shape of a button 34 which serves to start the mechanism by turning it in the direction indicated by the arrow. At the left is the stop or brake 35 which serves to suppress the movement of the regulator 32. A knob 36 through a worm 36ª and a worm wheel 36ᵇ regulates the balance wheel (see Fig. 4). The knob on turning towards S or F, provides for a slow or fast speed of the main wheel whereby the speed is regulated in such a way that the wheel makes one revolution per minute, and the proper timing may be obtained by comparing it with another watch.

A disc 50 (Fig. 4) is mounted on the shaft 30 adjacent the lower end thereof. Mounted on and in driving connection with a shaft 52 is a disc 51 which runs on the upper face of the disc 50. The disc 51 is moved along a shaft 52 radially of disc 50 by a yoke 49ᵇ mounted on a screw 49ª operated by milled knob 49. The rotation of the disc 50 drives the shaft 52 at a rate depending on the position of the disc 51. The shaft 52 has a worm 52ª thereon which meshes with the first wheel of and drives a metering mechanism 58ª, the registering means of which consists of a plurality of dials movable in a rotary sense in relation to fixed pointers. The mechanism just described constitutes a log and this log can be set to operate at the various speeds at which the air craft may be flown by alteration of the radial position of the disc 51. To indicate the speed at which the log is set to run, an indicator 60 is provided (Figure 2). This indicator consists of a scale movable in relation to a fixed pointer, the scale being actuated by a worm 53ª on the screw 49ª. The dials of the metering mechanism are frictionally mounted on the spindles and can thus be easily set to zero.

Referring more particularly to Figs. 7 and 8 it will be seen that a telescope A has an eye piece made of hard rubber as is well known, at one end, and an objective at the other end. The telescope is swingably mounted on an arm A' carried by a standard C which in turn is mounted on a base member C'. The arm A' is hollow and receives a shaft D'. The last mentioned shaft is rigidly connected with a U-shaped member, the U having bearings for an axle whereby the sight A is swingable in transverse vertical planes by reason of the revoluble mounting of the shaft D' in the arm A'.

The pulley D is secured to the telescope A and has wires 68 connected thereto as has been previously explained. Said wires are also connected to the pulley 18 whereby the movement of the pulley D causes a similar movement of the pulley 18 and likewise the pencil holder 3.

The pulley E is rigid with the shaft D' and is rocked in opposite directions by the movement of the telescope A in a plane which is at right angles to the wire E' and the standard C. The wire E' is connected to the pulley E and also to the pulley 19 so that rocking of the pulley E by the telescope A causes a similar movement of the pulley 19 and likewise a similar rocking movement of the tube 2 and the pencil holder 3.

The support is mounted on the floor of the aircraft by any approved means and to maintain the proper tension of the wires, turn buckles 90 (Fig. 9) are provided. Near the base C', standard C has an adjustable catch 1 which allows the telescope or sighting device to be fixed on its initial position by means of a clamp K. A pair of pulleys L are mounted on the base member C' over which the wires E' are trained before they are connected with the pulley 19. The pulleys L are so supported that they may be turned at will in order to fix them in any desired position when applying the sighting device to the air craft.

The sighting device is mounted on the base member C' in such a way that it may move approximately 50° in the longitudinal plane of the craft and 60° in a plane transverse thereto.

To mount the apparatus on air craft is a difficult problem since it will be necessary to open a window in the hull or shell to facilitate the vision of the ground, but this difficulty has been obviated by means of a device which consists of a spy glass mounted horizontally over the gunwale of the boat at a convenient height in order to permit the observer to properly apply his eye to the sighting means B.

Referring more particularly to Fig. 9, it will be seen that when the scriber and sighting apparatus are applied to the bottom 73 of the air craft, the base member 1ª is secured to the side 72 of the craft having an opening 74 provided in the bottom through which projects the free end of the telescope A.

Referring more particularly to Fig. 6, a straight bar 41 is mounted on the base member 1ª and is guided in sliding movement within a guide 42 which is provided with a screw 42ª by which the bar hereinafter referred to as the initial position bar may be held in a fixed position. The bar 43 is provided with scales and is mounted adjacent to and in parallel relation to the initial position bar. The bar 43 which will be referred to as the angle indicator is scaled from 10° to 30°. Said angle indicator is adjusted as to position when mounting the several parts on the air craft. Its setting depends on and corresponds with the mounting of the sighting means. Mounted on one end of the initial position bar 41 is a compass card 44ª which is arranged to be held by a clamp 45, which carries a pointer to cooperate with the angle indicator and an arrow which indicates the fore and aft line of the air craft. Also mounted on the initial position bar on the same center as and above the compass card 44ª is a rule 46 which is designated as a speed rule and of which one end 46ª extends over the compass card and is pointed and carries an indicating arrow. The speed rule is graduated in millimeters starting from the center of the compass card 44ª. Mounted on the speed rule so that it can be freely moved in relation thereto, both longitudinally and in a rotary sense, is a rule 47 which I designate as the wind rule and which consists of an oblong sheet of celluloid having a central scale 47ª graduated in millimeters and rulings parallel with the central slot. In connection with the apparatus just described, an abacus, is employed as illustrated in Fig 12, the abacus at the right hand side is provided with a series of curves indicating the speed and time, and is also ruled to define a vertical scale in feet to represent the altitude.

The curves of speed are derived from a formula as follows:—

$$\frac{\text{Distance in}}{\text{millimeters}} = 1518 \frac{\text{speed in knots}}{\text{altitude in feet}} \times \frac{\text{time in tenths}}{\text{of a minute}}$$

of which 1518 is a constant which varies with the size of the instrument and whether or not the distances to be measured are to be read in miles, kilometers or knots. The constant 1518 is correct for the instrument illustrated which is designed to indicate knots, the height of the arm 13 above the paper strip being taken at 15 centimeters. The curves shown on the left hand side of the abacus have no bearing on the present invention.

The electric circuits are three in number and consist of a coupling circuit, a recording circuit, and a lighting circuit. The coupling circuit includes electromagnet 28 which attracts the lever 27 for connecting the contact disc 26 with the main axle.

The circuit of the scriber includes an electromagnet 4 which causes the pencil holder 3 to oscillate every time that the spring contact 29 passes an insulated section of the disc 26.

The lighting circuit includes a lamp 38 placed on the horizontal support 1 and whose object it is to illuminate a paper on the table 1ª. This lamp is adapted to be lighted and extinguished by means of the interrupter including the contact members 16 and 17. The contact 16 is carried by the tube 12 and is adapted to be moved into engagement with the contact 17 when the tube is reciprocated. The circuits are fed by an electric battery 39ª of four volts. The circuit to the lamp may be opened by the switch 38ª when desired.

An auxiliary interrupter 40 is included in the circuits to test said circuits. The terminals 39 are connected with the battery, while the remaining terminals are with a switch which includes contacts G<sup>a</sup> and G<sup>4</sup> the standard C.

The contact G<sup>4</sup> is movable and is carried by the upper end of a lever G² pivoted at G³ on the standard C. A movable rod G is pivotally connected with the lever G² and is adapted to be reciprocated in one direction by the latch K, when said latch engages the catch I, thereby causing oscillation of the lever G², and moving the contact G⁴ away from the contact Gª. When the member K is released from the catch I a spring G⁵ (Fig. 7) on the rod G forces the rod in the opposite direction oscillating the lever G² whereby the contact G⁴ is moved into engagement with the contact Gª thereby closing the coupling and scriber circuits.

The operation of my device is as follows:

The log 58 has its scale set at zero. The time indicator of the watch 31 is also set at zero. The speed at which it is intended to fly the air craft is indicated on the scale 60. When the air craft has left the ground, the gearing 23ª is allowed to become operative by release of the brake 35 and when it is desired to commence observation, the telescope A is first adjusted and set in the initial position engaging the latch K in the catch I. The tube 6 is pulled out of the tube 12 so that it is held by the catch 13 in its extended position. The stylus 3 must rest in engagement with the notch of the spring member 21, the sheet of paper being also moved so that one of the rulings is in line with the notch.

Any object passing in the center of vision of the telescope is now picked out and by oscillation of the telescope A, the object is maintained in the center of vision, the stylus 3 being oscillated by means of the wires 68 and the pulleys connected with the tube 12. The stylus 3 will thus trace a line over the sheet of paper in accordance with the movement of the telescope. The disc influencing the electromagnet 4 causes the pencil 3 to make a mark indicating the expiration of each period of six seconds. The sighting of the object is maintained until the stylus 3 has been moved to and through an angle of 30° past the vertical at which point the catch 13 is automatically released and the tube 6 drawn within the tube 12 by the spring 14, thus raising the pencil off the paper. The disc is stopped by interruption of the electric circuit containing the electromagnet operating the clutch 27, the circuit being broken through the spacing of the contacts 16 and 17 which is caused by the rising of the tube 6 in the tube 12. The observer notes the height recorded by the altimeter, the speed as indicated by the air speed indicator, and also the number of periods of tenths of a minute indicated by the disc.

The initial position bar 41 is now set so that the pointer 45ª on the clamp 45 is opposite the index 20 (that being the initial angle of the telescope) on the angle indicator 43. The observer now refers to the abacus Figure 13

12 and notes on the vertical central scale the altitude, (say 3,000 ft.) at which the machine is flying. At this point the observer takes his horizontal line 200 through the curve (say 100) corresponding to the speed indicated by the air-speed meter. From this point a line 201 perpendicular to the line 200 is taken to the line indicating the time of observation (period of observation say 0.2 minutes) and from this point a horizontal line 202 is taken to the right hand vertical scale cutting the scale at 102. The number 102 indicates the position at which the wind rule 47 must be set on the speed rule 46. The compass card 44ª is now set to the magnetic course of flight and the speed rule 46 is set to point in the same direction. The wind rule is now adjusted to the number 102 on the speed rule 46 and positioned so that its slot comes over a point of a series of points forming a line on the graph that corresponds to the period of observation (0.2 minutes). These two points are united by a line which is drawn along the slot of the wind rule 47 and other lines are drawn on both sides of the wind rule. These lines indicate the direction of the wind and if the wind rule 47 is moved parallel to itself over the compass card 44ª the direction from which the wind is blowing is ascertained. The length of the line drawn along the slot of the wind rule 47 and uniting the two points mentioned represents the speed of the wind by the same scale used before. The distance between the initial point of the graph and the point at which the period of observation terminated is ascertained by measurement of the speed rule 46 and this figure represents the speed of the air craft in relation to the ground on the same scale as before. When it is desired to fly on a given track and the drift to be corrected is unknown, the head of the air craft is set towards a given course and the compass "wind" determined as indicated. The fractions of the minutes, such as 0.2, represent arbitrary periods of observation and an observer selects such a point on the graphical device which corresponds with the period of observation and which therefore represents a greater probability of being correctly placed.

The wind rule is then set in the direction of the wind, but to the opposite side of the base line and in such a way that the figure representing the speed of the wind rests on the base line. The end of the speed rule over the compass card 44ª will give the course corrected for drift. The distance between the initial point and that one marked on the base line is measured by the speed rule and this gives in scale the speed in relation of the ground that must be set on the dial 60. The log marks the number of miles flown from the start. Each time that the craft passes over any known point or mark easy to recognize the observer should consult the log to ascertain if it is working correctly, so as to know what to expect when the ground is not visible.

I claim:

1. An apparatus of the class described comprising a support, a sighting member, means for mounting the sighting member for universal oscillation on the support, a recording device including a stylus and a support for the stylus, means for mounting the support for the stylus for universal oscillation, means operatively connecting the support for the stylus with the sighting member whereby the stylus will be moved in synchronism with the sight, an electric circuit including make and break means actuated periodically for closing and opening the circuit, and means included in the circuit and actuated by the making and breaking means for causing periodic oscillation of the stylus independently of the support for the stylus.

2. An apparatus of the class described comprising a sighting means mounted for universal oscillation, a recording device including a stylus and a support for said stylus, means operatively connecting the support with the sighting member so that the movements of the sighting member will be translated to the stylus, and means actuated periodically and having operative connections with the stylus for causing oscillation of the stylus independently of the support for the stylus to indicate graphically periods of time.

3. An apparatus of the class described comprising a sighting means mounted for universal oscillation, a recording device including a stylus and a support for said stylus, means operatively connecting the support with the sighting member so that the movements of the sighting member will be translated to the stylus, an electric circuit including make and break means actuated for closing and opening the circuit periodically, and means in the circuit and controlled by the closing and opening of the circuit for causing oscillation of the stylus independently of the support for the stylus to indicate graphically periods of time, means for operating the make and break means, and means actuated by the last mentioned means and in synchronism with the make and break means for indicating the periods of time over which the stylus is oscillated.

4. An apparatus of the class described comprising a sighting means mounted for universal oscillation, a recording device including a stylus and a support for said stylus, means operatively connecting the support with the sighting member so that the movements of the sighting member will be translated to the stylus, an electric circuit including make and break means actuated for closing and opening the circuit periodically, and means in the circuit and controlled by the closing and opening of the circuit for causing oscillation of the stylus independently of the support for the stylus to indicate graphically periods of time, means for operating the make and break means, and means actuated by the last mentioned means and in synchronism with the make and break means for indicating the periods of time over which the stylus is oscillated, a log mechanism for registering the miles flown by the air craft during the periodic oscillation of the stylus, and actuated by the means which operates the make and break means.

5. An apparatus of the class described comprising a sighting means mounted for universal oscillation, a recording device including a stylus and a support for said stylus, means operatively connecting the support with the sighting member so that the movements of the sighting member will be translated to the stylus, an electric circuit including make and break means actuated for closing and opening the circuit periodically, and means in the circuit and controlled by the closing and opening of the circuit for causing oscillation of the stylus independently of the support for the stylus to indicate graphically periods of time, means for operating the make and break means, and means actuated by the last mentioned means and in synchronism with the make and break means for indicating the periods of time over which the stylus is oscillated, a log mechanism for registering the number of miles flown by the air craft from the starting position of said aircraft, and actuated by the means which operates the make and break means, a circuit including means for controlling the starting or stopping of the mechanism for actuating the log, the timing means, and the make and break means.

6. An apparatus of the class described comprising a sighting means mounted for universal oscillation, a recording device including a stylus and a support for said stylus, means operatively connecting the support with the sighting member so that the movements of the sighting member will be translated to the stylus, an electric circuit including make and break means actuated for closing and opening the circuit periodically, and means in the circuit and controlled by the closing and opening of the circuit for causing oscillation of the stylus independently of the support for the stylus to indicate graphically periods of time, means for retaining the support and stylus in an operative position, and means for automatically releasing the retaining means when the support is oscillated beyond a predetermined angle, and means whereby the stylus is moved to an inoperative position upon the release of said retaining means.

7. An apparatus of the class described comprising a sighting means mounted for universal oscillation, a recording device including a stylus and a support for said stylus, means operatively connecting the support with said sighting member so that the movements of the sighting member will be translated to the stylus, an electric circuit including make and break means actuated for closing and opening the circuit periodically, and means in the circuit and controlled by the closing and opening of the circuit for causing oscillation of the stylus independently of the support for the stylus to indicate graphically periods of time, a support for the stylus being slidably mounted along its longitudinal axis, a switch actuated by the sliding movement of the support for causing opening and closing of the circuit.

8. In an apparatus of the class described, a bar provided with scales normally maintained stationary, a member slidable along the bar and provided with a pointer adapted to be alined with one of the scales on the bar, a circular compass card mounted for rotation on the member, a scaled pointer having one end pivotally secured to the center of the compass card, an elongated bar provided with a slot there being scales upon opposite sides of the slot, and means for pivotally and slidably mounting the last mentioned bar on the pointer.

ADIRIO ORFELIO JESSEN.